(12) United States Patent
Sun et al.

(10) Patent No.: US 10,652,537 B1
(45) Date of Patent: May 12, 2020

(54) CODING UNIT SIZE ADAPTIVE PALETTE MODE FOR VIDEO COMPRESSION SYSTEM

(71) Applicant: Alibaba Group Holding Limited, Grand Cayman (KY)

(72) Inventors: Yu-Chen Sun, Bellevue, WA (US); Jian Lou, Bellevue, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/198,292

(22) Filed: Nov. 21, 2018

(51) Int. Cl.
*H04N 19/186* (2014.01)
*H04N 19/12* (2014.01)
*H04N 19/176* (2014.01)
*H04N 19/159* (2014.01)

(52) U.S. Cl.
CPC ........... *H04N 19/12* (2014.11); *H04N 19/159* (2014.11); *H04N 19/176* (2014.11); *H04N 19/186* (2014.11)

(58) Field of Classification Search
None
See application file for complete search history.

(56) References Cited

U.S. PATENT DOCUMENTS

2017/0195676 A1* 7/2017 Chuang ................ H04N 19/157
2018/0176587 A1* 6/2018 Panusopone ......... H04N 19/593

OTHER PUBLICATIONS

Bross et al., "High Efficiency Video Coding (HEVC) Text Specification Draft 9," ITU-T/ISO/IEC Joint Collaborative Team on Video Coding (JCT-VC), Oct. 2012, 285 pages.
Joshi et al., "High Efficiency Video Coding (HEVC) Screen Content Coding Draft 1," in Document of Joint Collaborative Team on Video Coding, JCTVC-R1005, 18th Meeting, Sapporo, JP, Jun. 30-Jul. 9, 2014, 358 pages.
English Translation of PCT Patent Application PCT/CN18/094496 filed on Jul. 4, 2018, Yu-Chen Sun et al., "Palette-Based Residual Coding for Video Compression System," 43 pages.
Pu et al., "Palette mode coding in HEVC screen content coding extension," IEEE Journal on Emerging and Selected Topics in Circuits and Systems 6.4 (Dec. 2016), pp. 420-432.
Sullivan et al., "Overview of the High Efficiency Video Coding (HEVC) Standard," IEEE Transactions on Circuits and Systems for Video Technology, vol. 22, No. 12, Dec. 2012, 20 pages.
Wiegand et al., "Draft ITU-T recommendation and final draft international standard of joint video specification (ITU-T Rec. H.264/ISO/IEC 14-10 AVC," Joint Video Team (JVT) of ISO/IEC MPEG and ITU-T VCEG JVT-G050, Mar. 2003, 264 pages.

* cited by examiner

*Primary Examiner* — Christopher G Findley
(74) *Attorney, Agent, or Firm* — Lee & Hayes, P.C.

(57) ABSTRACT

Systems and methods are provided for improving efficiency of decoding performance of a video compression system by selectively applying, based on the size of the coding unit, a prediction method, a palette mode, or palette-based residual refinement method which combines the palette mode and the traditional prediction methods comprising deriving a prediction block of a coding unit, decoding palette-based residual information of the coding unit, deriving a palette-based residual block based on the decoded palette-based residual information, and combining the prediction block and the palette-based residual block to construct a reconstructed block.

19 Claims, 16 Drawing Sheets

DIAGONAL TOP-RIGHT MODE

DIAGONAL BOTTOM-LEFT MODE

ADJACENT DIAGONAL TOP-RIGHT MODE

ADJACENT DIAGONAL BOTTOM-LEFT MODE

CODING UNIT SIZE ADAPTIVE PALETTE MODE FOR VIDEO COMPRESSION SYSTEM

BACKGROUND

The state-of-the-art video coding standard, such as H.264/AVC (Advanced Video Coding), H.264/MPEG-4 AVC, and H.265/HEVC (High Efficiency Video Coding) standard, is based on a hybrid coding scheme using block-based prediction and transform coding. To compress a video frame, a video compression system applies prediction methods, such as intra-prediction or inter-prediction, to derive a prediction frame. Based on the prediction frame, the video compression system further encodes residual information to refine the prediction frame. The residual information is usually compressed by transform and quantization techniques. Based on those information, a decoder is able to reconstruct the video frame from the prediction frame and the residual information. The decoder combines a prediction block and a residual block to generate a reconstructed block by simply adding prediction pixel values and residual pixel values to generate final reconstructed pixel values.

A new coding tool, palette mode, is adopted to standardize Screen Content Coding Extensions of High Efficiency Video Coding (HEVC SCC). The palette mode can efficiently describe all pixels in a coding unit (CU) with few selected representative colors. The palette mode is designed based on the observation that the pixel values in a screen content frame are usually concentrated on few color values. An encoder analyzes the pixels in a CU and determines several representative colors to construct a palette table, i.e., a color mapping table between the representative color values and color indices. The palette table is signaled in a bitstream. Pixels with pixel values close to palette colors are quantized to selected palette colors denoted by corresponding palette indices. The rest of the pixels are called escape pixels. A special palette index value is reserved to represent the escape pixels, and pixel values of the escape pixels are signaled directly. All palette indices in the CU form a palette index map, which is transmitted to a decoder along with the escape pixel values. A pixel or a palette index may represent a single color or three-color component values, for example, YCbCr or GBR.

In the HEVC palette mode, if a block is encoded by the palette mode, it will be decoded independently without using any prediction method or residual refinement. To address this issue, a palette-based residual refinement method may be used. However, it is not efficient to apply a full version of the HEVC palette mode or the palette-based residual refinement method on coding units of all sizes when a subset of intra/inter prediction tools is adequate for small coding units.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to improving video compression system performance in the HEVC palette mode, and more specifically to improving efficiency of decoding performance by selectively applying a palette mode, a palette-based residual refinement method, or a prediction method based on the size of the coding unit.

Figure 1:
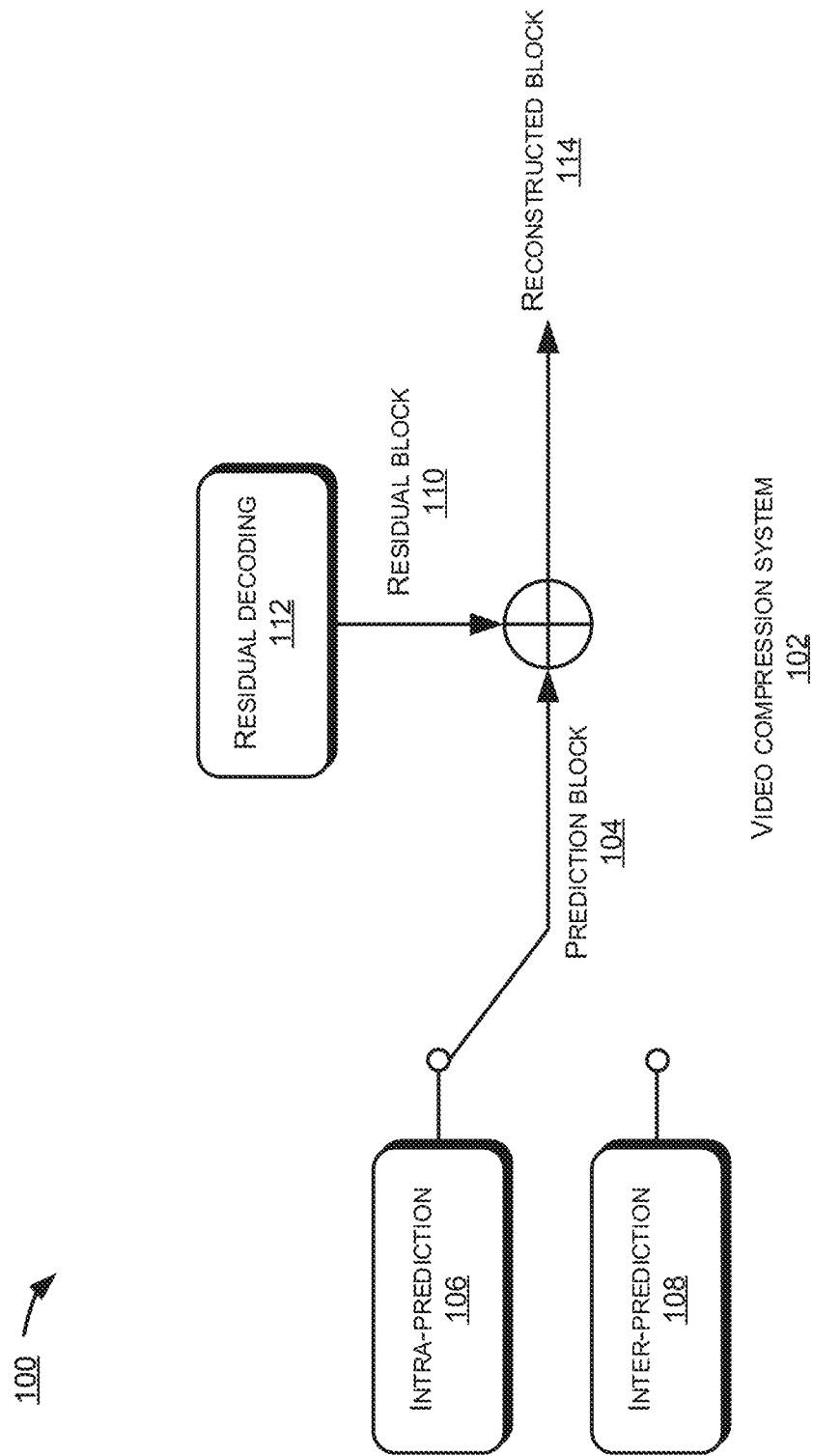
FIG. 1 illustrates an example decoding process of a video compression system using prediction methods.

FIG. 1 illustrates an example decoding process 100 of a video compression system 102 using prediction methods.

The video compression system 102 first derives a prediction block 104 by applying a prediction method, such as intra-prediction 106 or inter-prediction 108, and then decodes a residual block 110 by applying a residual decoding method 112. The video compression system 102 combines the prediction block 104 and the residual block 110 to generate a reconstructed block 114.

Figure 2:
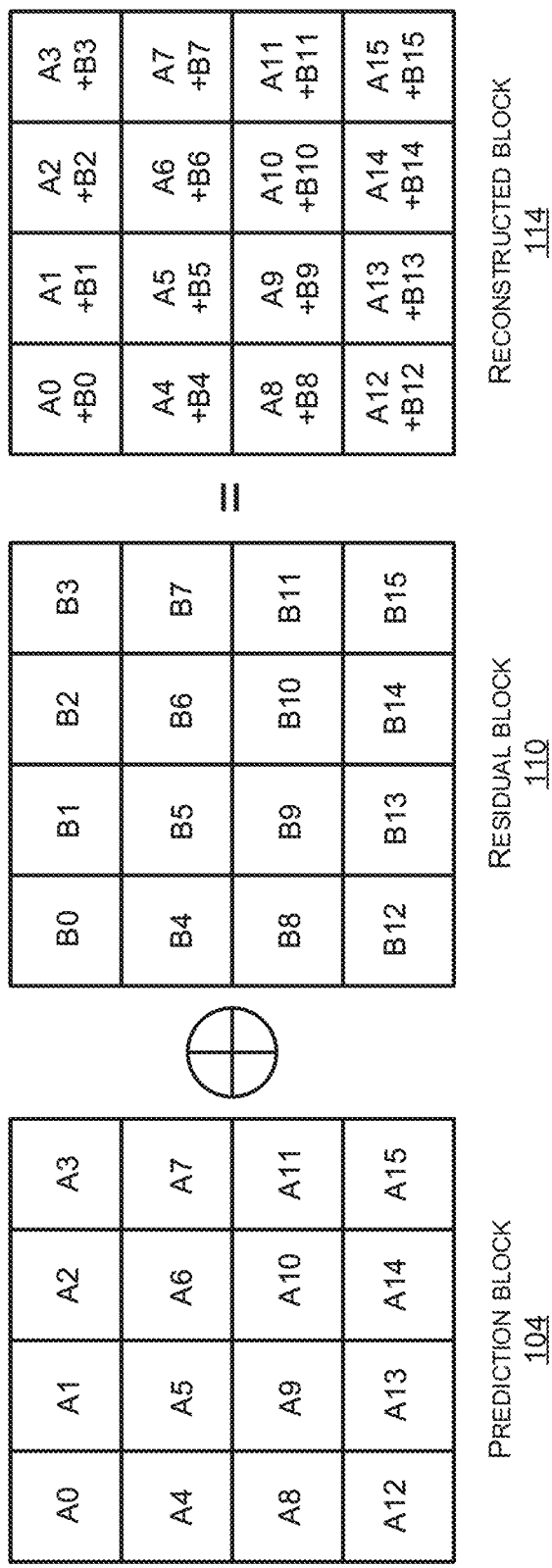
FIG. 2 illustrates an example prediction block, an example residual block, and an example reconstructed block derived by the video compression system of FIG. 1.

FIG. 2 illustrates example prediction block 104, residual block 110, and reconstructed block 114 derived by the video compression system 102 of FIG. 1.

The prediction block 104 and the residual block 110 are illustrated with the pixel values of coding units (CUs). As discussed above with reference to FIG. 1, the corresponding pixel values of the prediction block 104 and the residual block 110 are simply added to generate corresponding pixel values of the reconstructed block 114.

Figure 3:
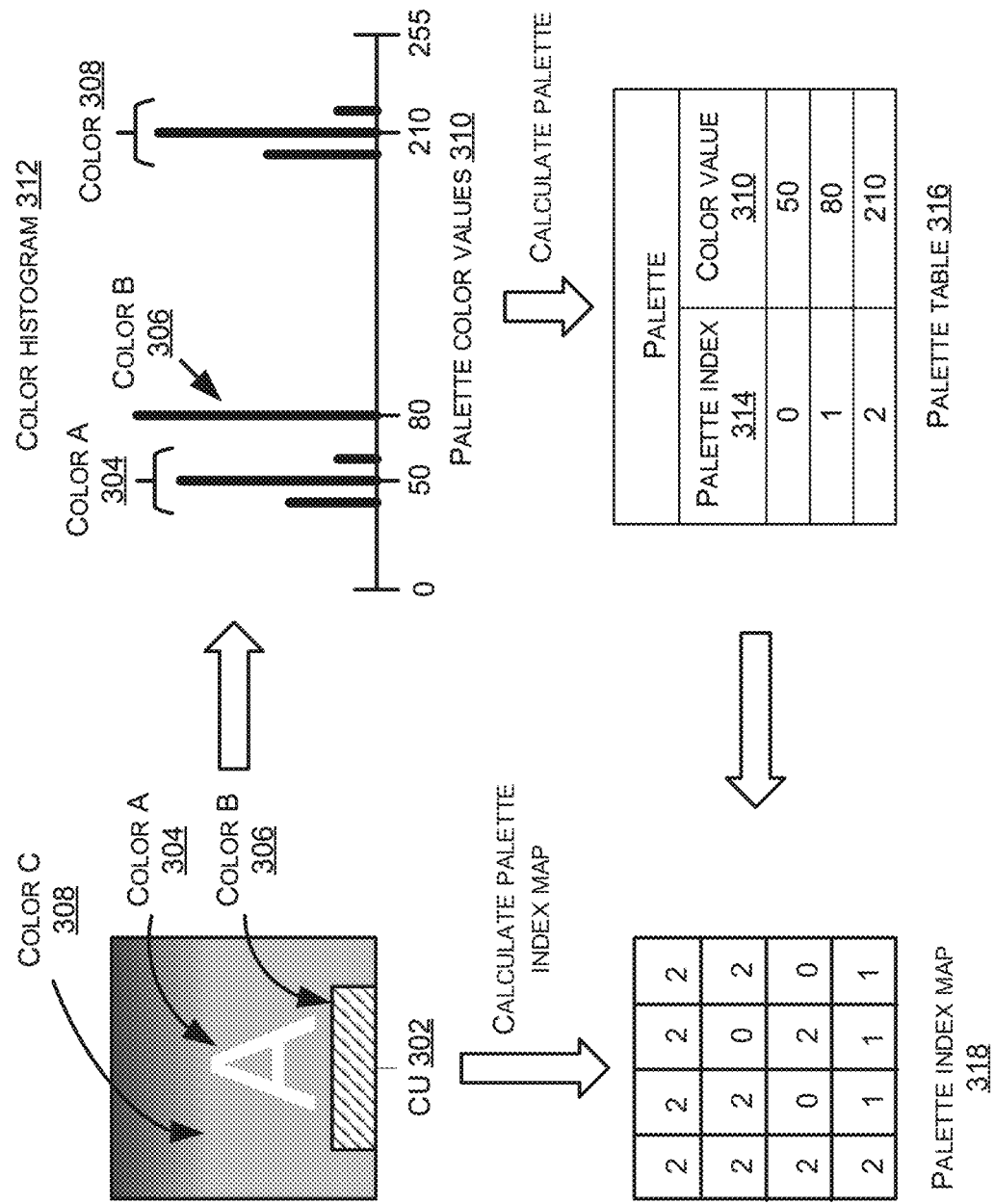
FIG. 3 illustrates an example diagram of the palette mode applied to an image.

FIG. 3 illustrates an example diagram 300 of the palette mode applied to CU 302. For simplicity, a pixel or a palette index is shown to correspond to only one value. However, in HEVC SCC, a pixel or a palette index may represent three color component values, such as YCbCr or GBR.

In the HEVC SCC palette mode, a flag is transmitted for each CU to indicate whether the palette mode is used for that CU, such as a CU 302. If the palette mode is used for the CU 302, the pixels, having pixel values close to palette colors, such as color A 304, color B 306, and color C 308, are represented by the palette color values 310 as shown in a color histogram 312. For example, the color A 304 is shown to be close to the palette color value of 50, the color B 306 is shown to be close to the palette color value of 80, and the color C 308 is shown to be close to the palette color value of 310. The palette color values 310 of the CU 302 are denoted by palette indices 314, where the palette color values 310 are representative colors of the CU 302 as shown in a palette table 316. The remaining pixels are presented by a special palette index value, denoted as an escape index, and their pixel values are signaled directly. Note that a color is a 3-value, for example, YCbCr or GBR, vector. Palette indices of all pixels in the CU 302 form a palette index map 318.

Figure 4:
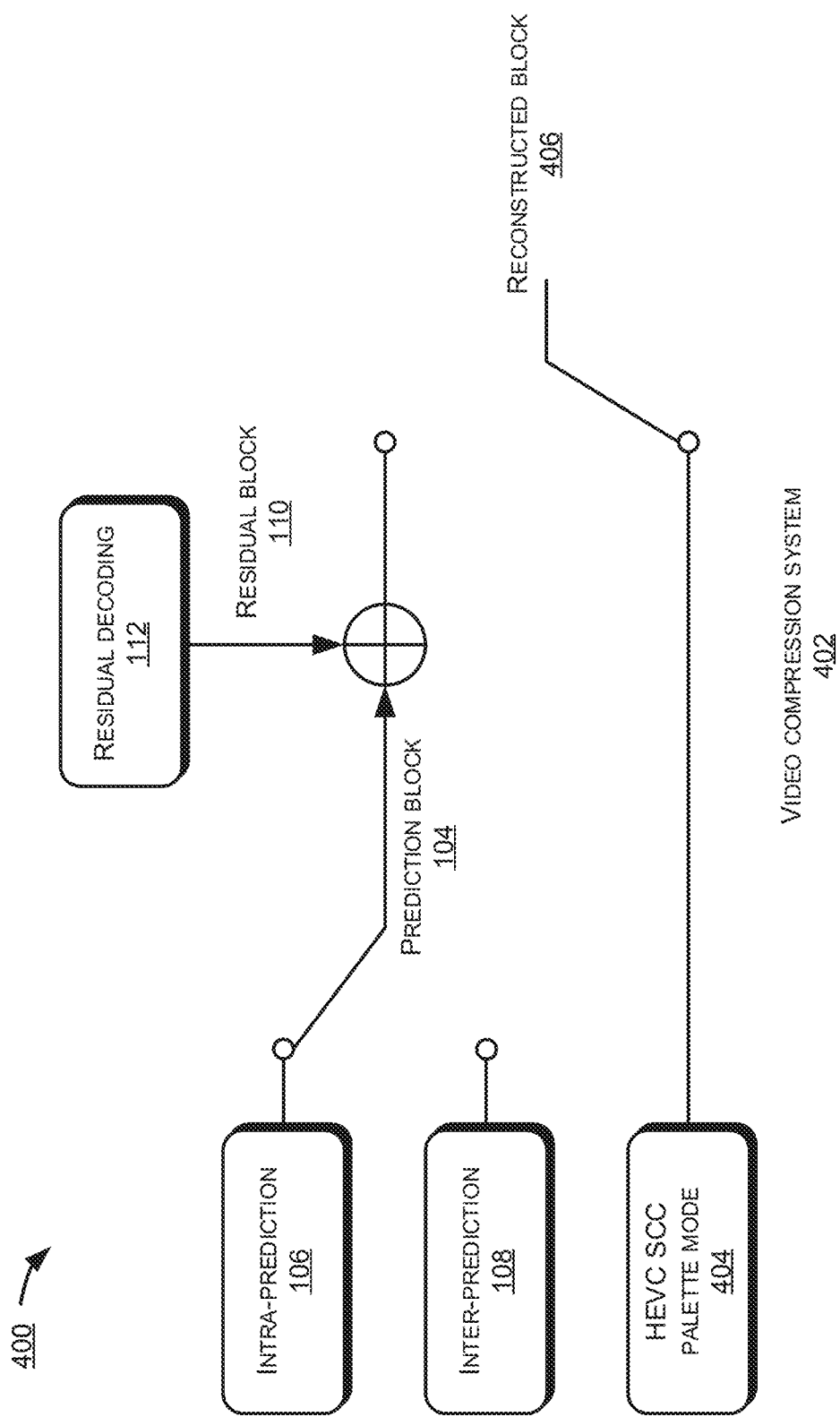
FIG. 4 illustrates an example decoding process of the video compression system using HEVC SCC palette mode.

FIG. 4 illustrates an example decoding process 400 of the video compression system 402 using HEVC SCC palette mode.

Compared to the intra/inter-prediction methods described with reference to FIG. 1, if a block, or a CU, is encoded by the HEVC SCC palette mode 404, it is decoded independently to generate a reconstructed block 406 without using any prediction method or residual refinement. To decode a palette encoded block, a video decoder of the video compression system 402 decodes palette colors and indices. Palette colors are described by a palette table, such as the palette table 316, and encoded by palette table coding tools. Based on the palette table, a pixel of three color components is represented by a palette index, such as the palette index 314. Palette indices of all pixels in the CU form a palette index map, such as the palette index map 318, and are encoded by palette index map coding tools.

Figure 5:
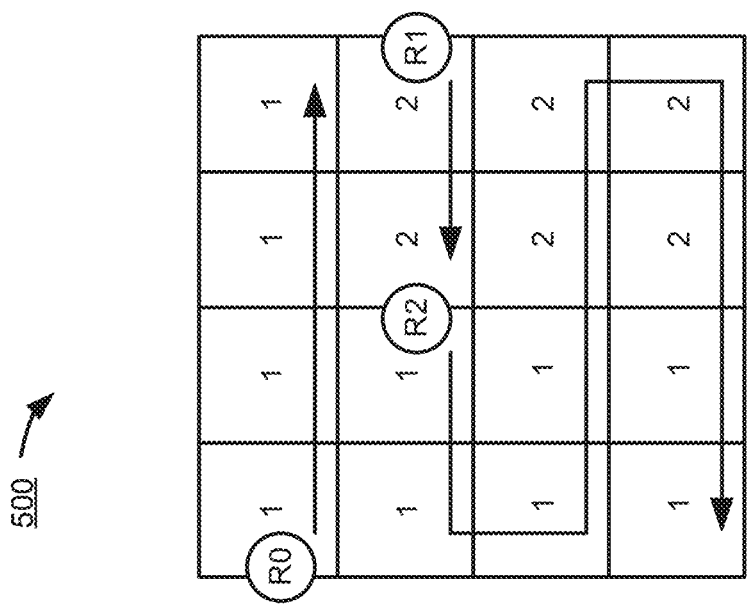
FIG. 5 illustrates an example palette index mapping using the HEVC SCC palette mode.

FIG. 5 illustrates an example the palette index map coding 500.

The video compression system 402 constructs a palette table predictor to predict a palette table, such as the palette table 316, of the current CU by applying predictive coding where the palette of the last palette coded CU is used as the predictor. After the palette table is encoded, the pixels in the current CU are represented by palette indices 502 corresponding to the colors in the palette as shown in a parameter table 504 along with other parameters of the palette index map coding. The indices form a palette index map 506 which is divided into several runs and then encoded in horizontal or vertical traverse scan order. In this example, the horizontal scan order is assumed, and the direction of the scan is shown as arrows in the palette index map 506. In the palette index map 506, 16 indices are encoded by run indices 508, three runs R0, R1, and R2, with horizontal traverse scan. There are two run modes 510, copy index mode and copy above mode, and for each starting position of a run, a flag is transmitted to indicate which run mode is used.

If the copy above mode is used, a run of pixels 512 will copy the palette indices from their above pixels. In this example, a run, R2, is a copy above run with a run value of 10. If the copy index mode is used, a palette index_idc syntax element is first signaled, followed by a piece of PaletteIndexRun information. The palette_index_idc syntax describes whether the run is copy index mode (palette_index_idc=0) or copy above mode (palette_index_idc=1), and the PaletteIndexRun syntax describes the length of the run. A run of pixels 512 shares the same palette index 502, where the palette index 502 and the run value of the run of pixels 512 are derived from the palette_index_idc and PaletteIndexRun, respectively.

Figure 6:
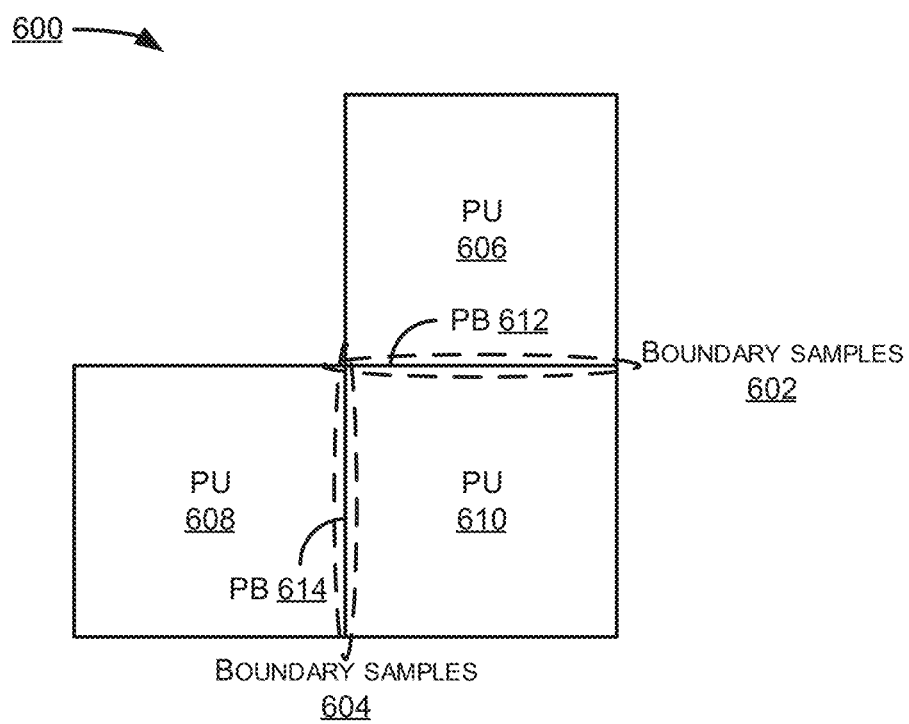
FIG. 6 illustrates an example graphical representation of an intra prediction.
Figure 7A:
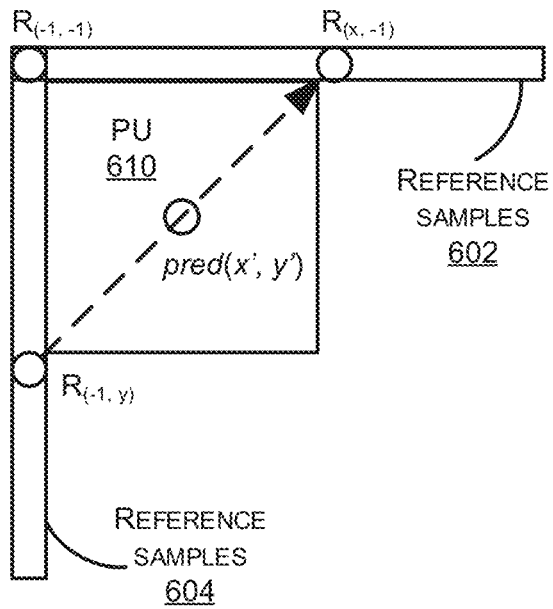
FIGS. 7A-D illustrate example definitions of samples used by the PDPC applied to diagonal and adjacent angular intra modes.
Figure 7B:
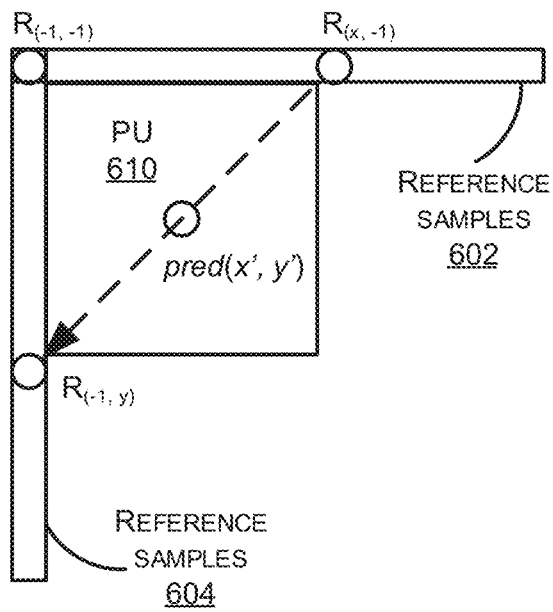
Figure 7C:
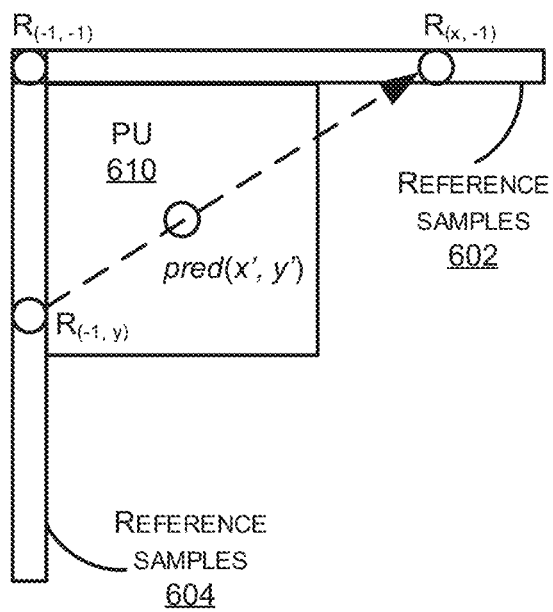
Figure 7D:
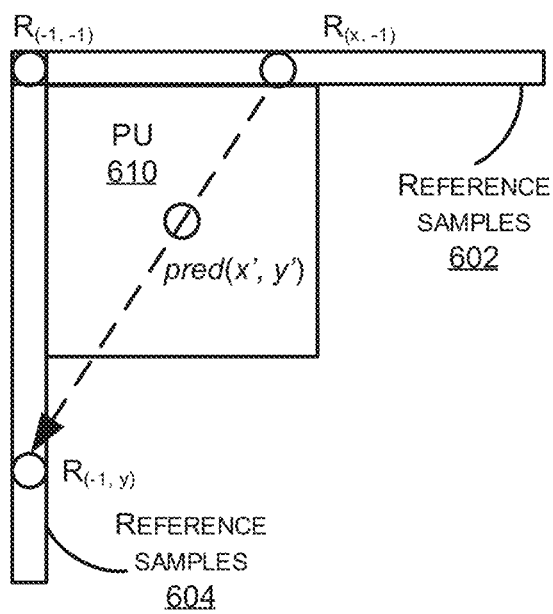

FIG. 6 illustrates an example graphical representation 600 of an intra prediction.

The intra prediction uses the previously decoded boundary samples, or reference samples, 602 and 604 from spatially neighboring prediction units (PUs) 606 and 608 to predict a PU 610. For luma prediction for all block sizes, the HEVC supports a total of 35 prediction modes including 33 Intra—Angular prediction modes and two non-directional predictions, i.e., Intra—Planar and Intra—DC prediction modes. Due to the increased number of directions, the HEVC considers three most probable modes (MPMs) when coding the luma intra prediction mode predictively, rather than the one most probable mode considered in the H.264/MPEG-4 AVC. Among the three MPMs, the first two are initialized by the luma intra prediction modes of the above and left prediction boundaries (PBs), such as PBs 612 and 614, respectively, if those PBs are available and are coded using an intra prediction mode. Any unavailable prediction mode is considered to be Intra—DC. The PB above the luma coding tree block (CTB) is always considered to be unavailable to avoid the need for storing a line buffer of neighboring luma prediction modes.

When the first two MPMs are not equal, the third MPM is set equal to one of the Intra—Planar, Intra—DC, or Intra—Angular (vertical), according to which of these modes, in this order, is not a duplicate of one of the first two modes. When the first two MPMs are the same and have the value Intra—Planar or Intra—DC, the second and third MPMs are assigned as Intra—Planar, Intra—DC, or Intra—Angular, according to which of these modes, in this order, are not duplicates. When the first two MPMs are the same and the first mode has an Intra—Angular value, the second and third MPMs are chosen as the two angular prediction modes that are closest to the angle of the first. In the case that the current luma prediction mode is one of three MPMs, only the MPM index is transmitted to the decoder. Otherwise, the index of the current luma prediction mode excluding the three MPMs is transmitted to the decoder by using a 5-b fixed length code.

In the VVC/H.266, several improvements have been adopted. To capture the arbitrary edge directions presented in natural video, the number of directional intra modes in VVC/H.266 is extended from 33, as used in HEVC, to 65. In the VVC/H.266, the results of the intra prediction of the planar mode in the HEVC are further modified by a position dependent intra prediction combination (PDPC) method. The PDPC is an intra prediction method which invokes a combination of the un-filtered boundary reference samples and an HEVC style intra prediction with filtered boundary reference samples. The PDPC is applied to the following intra modes without signaling: planar, DC, horizontal, vertical, bottom-left angular mode and its eight adjacent angular modes, and top-right angular mode and its eight adjacent angular modes.

The prediction sample pred(x, y) is predicted using an intra prediction mode (DC, planar, angular) and a linear combination of reference samples as provided below:

$$\mathrm{pred}(x,y) = (wL \times R_{-1,y} + wT \times R_{x,-1} - wTL \times R_{-1,-1} + (64 - wL - wT + wTL) \times \mathrm{pred}(x,y) + 32) >> 6;$$

where $R_{x,-1}$, $R_{-1,y}$ represent the reference samples located at the top and left of current sample (x, y), respectively, and $R_{-1,-1}$ represents the reference sample located at the top-left corner of the current block. If the PDPC is applied to DC, planar, horizontal, and vertical intra modes, additional boundary filters are not needed, as required in the case of the HEVC DC mode boundary filter or horizontal/vertical mode edge filters.

FIGS. 7A-D illustrate example definitions of reference samples ($R_{x,-1}$, $R_{-1,y}$, and $R_{-1,-1}$) for the PDPC applied over various prediction modes. The prediction sample pred(x', y') is located at (x', y') within the prediction block. The coordinate x of the reference sample $R_{x,-1}$ is given by: x=x'+y'+1, and the coordinate y of the reference sample $R_{-1,y}$ is similarly given by: y=x'+y'+1. FIG. 7A-7D illustrate a diagonal top-right mode, a diagonal bottom-left mode, an adjacent diagonal top-right mode, and an adjacent diagonal bottom-left mode, respectively.

The PDPC weights are dependent on the prediction modes and are shown in Table 1 below, where wT is the weight for the top reference sample, wL is the weight for the left reference sample, and wTL is the weight for the top-left reference sample.

TABLE 1

PDPC weight examples according to prediction modes

| Prediction modes | wT | wL | wTL |
|---|---|---|---|
| Diagonal top-right | 16 >> ((y' << 1) >> shift) | 16 >> ((x' << 1) >> shift) | 0 |
| Diagonal bottom-left | 16 >> ((y' << 1) >> shift) | 16 >> ((x' << 1) >> shift) | 0 |
| Adjacent diagonal top-right | 32 >> ((y' << 1) >> shift) | 0 | 0 |
| Adjacent diagonal bottom-left | 0 | 32 >> ((x' << 1) >> shift) | 0 |

Figure 8:
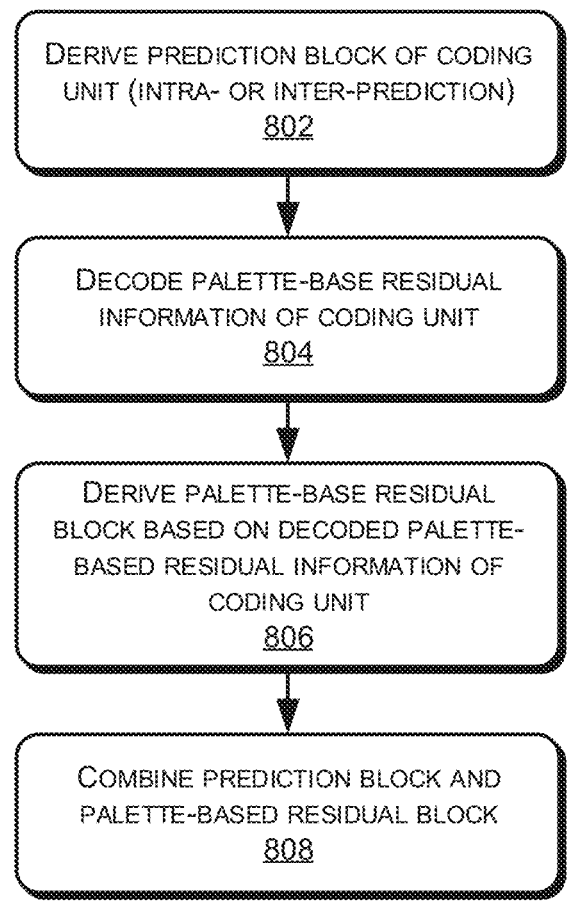
FIG. 8 illustrated an example flowchart for the palette-based residual coding.

FIG. 8 illustrated an example flowchart 800 of the palette-based residual coding in a video compression system.

At block 802, the video compression system may derive a prediction block, such as the prediction block 104, of a coding unit (CU), which may be derived by using a conventional prediction method, such as an intra-prediction or inter-prediction method as discussed above with reference to FIG. 1. The video compression system may construct a palette table predictor to predict the palette table of the current CU and may utilize the palette of the last palette coded CU as the predictor. The video compression system may use a palette of a non-adjacent coding unit relative to the coding unit as a palette predictor to predict a palette table of the coding unit and apply the predicting method to the palette table to derive the prediction block. At block 804, the video compression system may decode palette-based residual information of the coding unit and, based on the decoded palette-based residual information, may derive a palette-based residual block of the coding unit at block 806. At 808, the video compression system may combine the prediction block and the palette-based residual block to construct a reconstructed block. The video compression system may refine the prediction block based on the decoded palette-based residual information and improve the coding and/or decoding performance by combining palette mode and the traditional prediction methods, thus improving the decoding performance of the video compression system.

Figure 9:
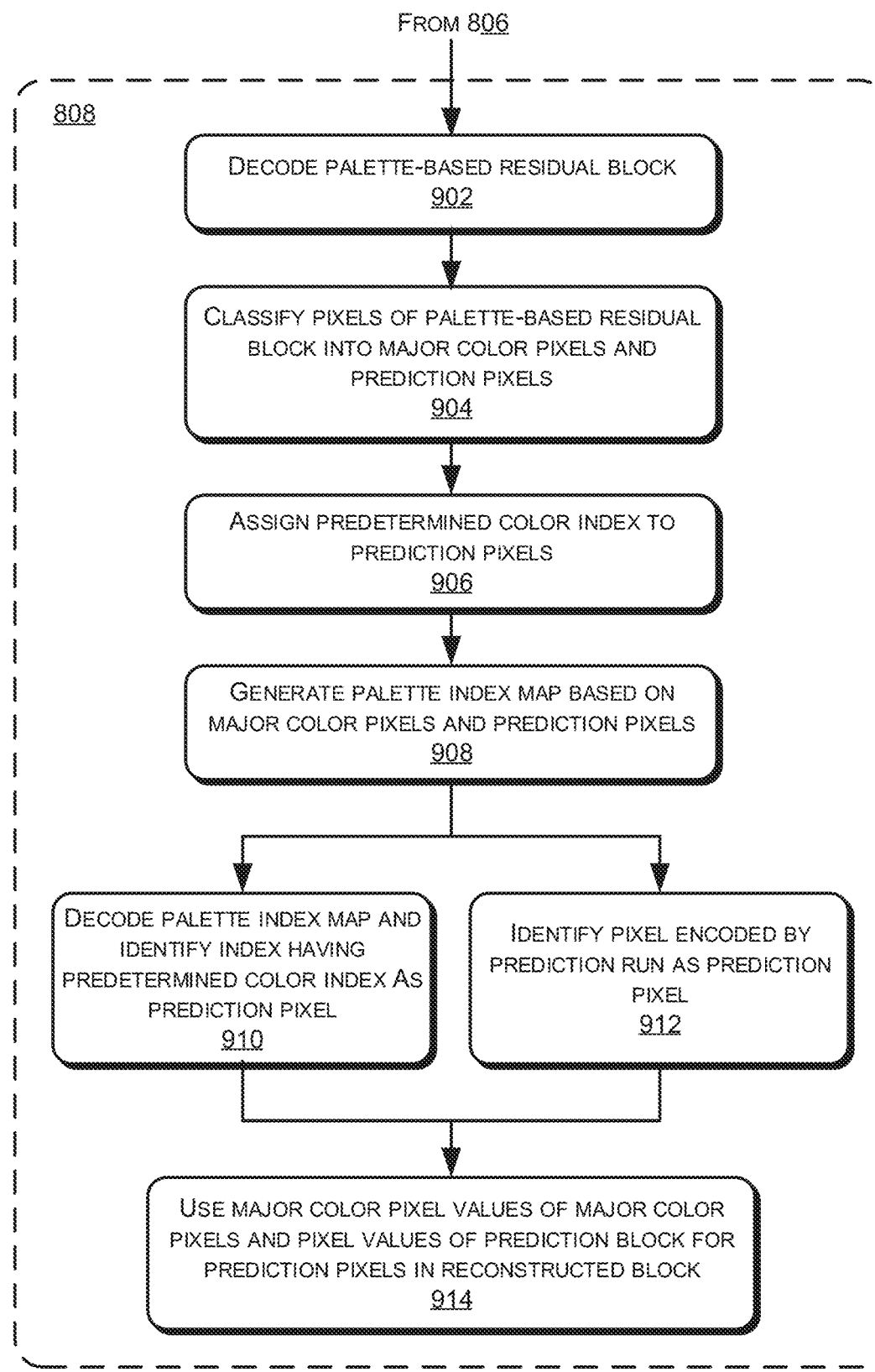
FIG. 9 illustrates an example flowchart detailing one of blocks of FIG. 8.

FIG. 9 illustrates an example flowchart detailing block 808 of FIG. 8.

The video compression system may refine the prediction block 104 based on the decoded palette-based residual information by decoding the palette-based residual block at block 902 and classify pixels of the palette-based residual block into two groups, such as major color pixels and prediction pixels at block 904. The major color pixels may have palette indices associated with major color pixel values of the decoded palette-based residual block similar to the association shown in the palette table 316. At block 906, the prediction pixels are assigned a predetermined color index, such as C0, C1, etc., and the video compression system may generate a palette index map based on the major color pixels and prediction pixels at block 908.

The video compression system may signal whether a pixel in the palette-based residual block is a major color pixel or a prediction pixel by decoding the palette index map and identifying an index having the predetermined color index as a prediction pixel at block 910 or by identifying a pixel encoded by a prediction run as a prediction pixel at block 912. The video compression system may use the major color pixel values of the major color pixels and pixel values of the prediction block for the prediction pixels in the reconstructed block and transfer pixel values of the prediction block for the prediction pixels in the reconstructed block at block 914, thus combining the palette mode and the traditional prediction methods to improve the decoding performance of the video compression system.

Figure 10:
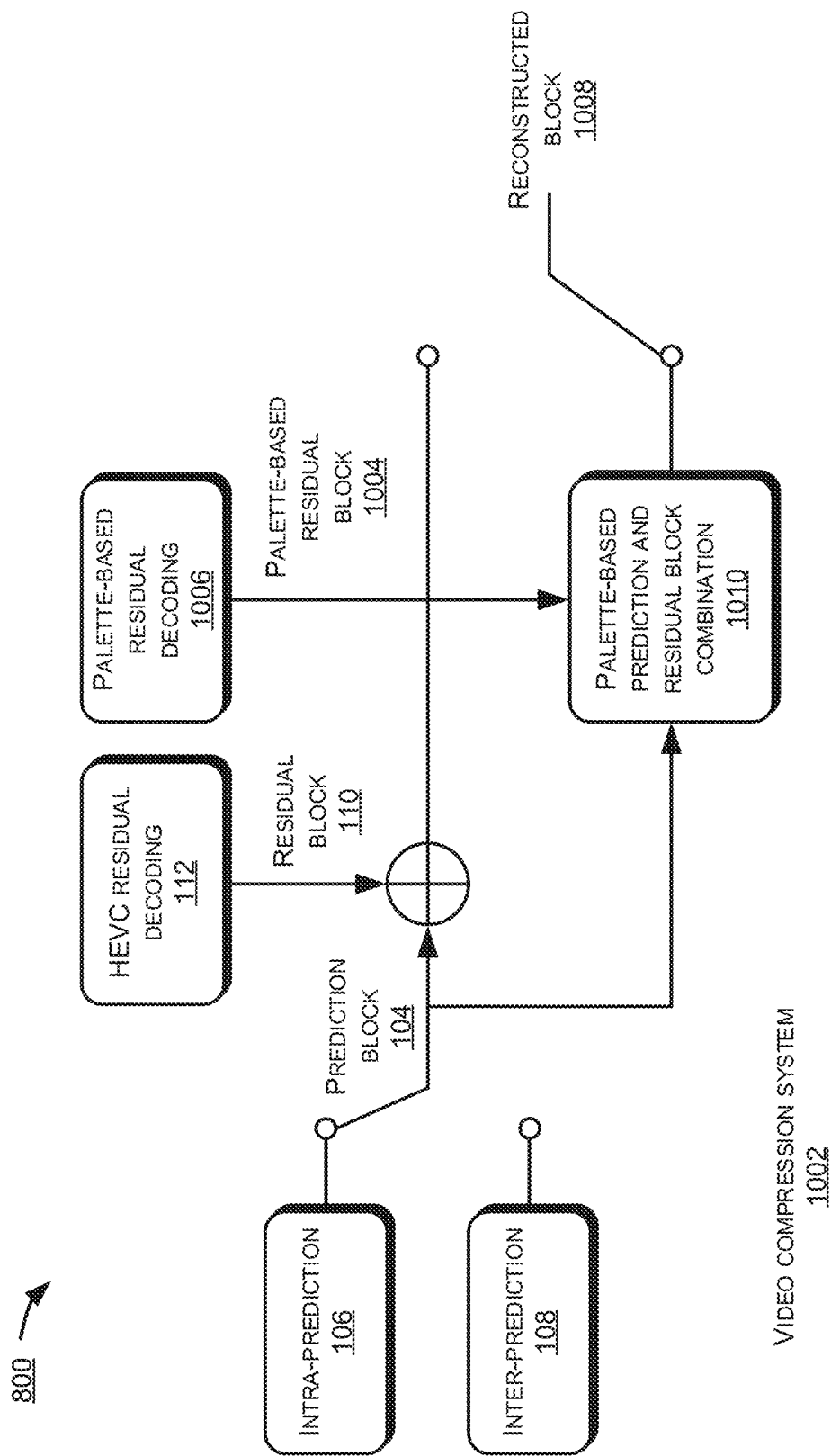
FIG. 10 illustrates an example decoding process of the video compression system using palette-based residual refinement method.

FIG. 10 illustrates an example decoding process 1000 of the video compression system 1002 using the palette-based residual refinement method.

The video compression system 1002 may include an option of combining the palette mode and the traditional prediction methods as described above with reference to FIGS. 8 and 9, in addition to the HEVC residual decoding as described above with reference to FIGS. 4 and 5. The video compression system 1002 may derive a palette-based residual block 1004 by applying the palette-based residual decoding 1006 to palette-based residual information. The video compression system 1002 may then construct a reconstructed block 1008 by applying the palette-based prediction and residual block combination 1010 to information from the prediction block 104 and the palette-based residual block 1004.

Figure 11:
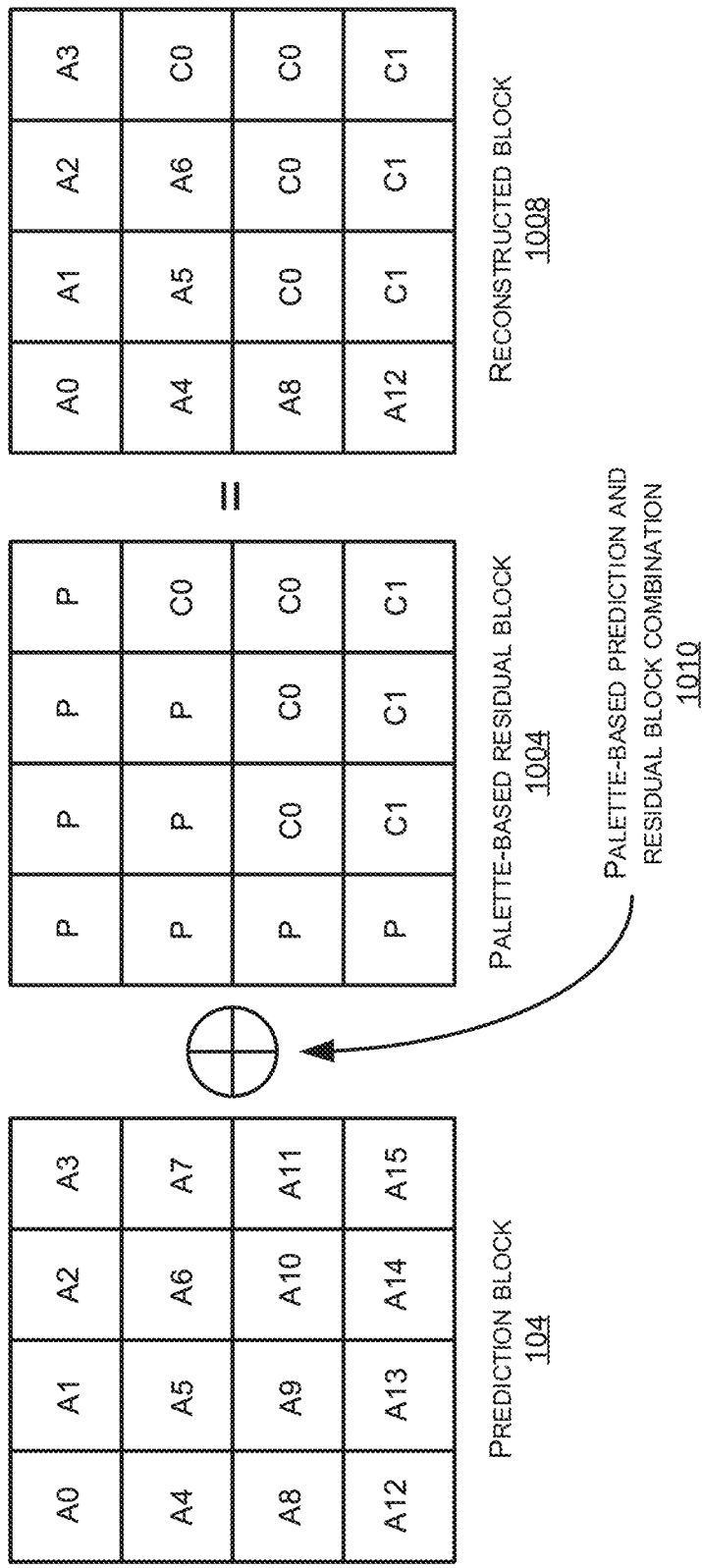
FIG. 11 illustrates an example prediction block, an example palette-based residual block, and an example reconstructed block derived by the video compression system of FIG. 10 using the palette-based residual decoding.

FIG. 11 illustrates the prediction block 104, the palette-based residual block 1004, and the reconstructed block 1008 derived by the video compression system 1002 of FIG. 10 using the palette-based residual decoding.

The video compression system 1002 may derive the prediction block 104 as described above with reference to FIG. 1 and may then decode a palette-based residual block 1004. Before reconstructing the reconstructed block 1008, the video compression system 1002 may derive and use the palette-based residual block 1004 as described above with reference to FIG. 10 to refine the prediction block 104. The video compression system 1002 may classify pixels in the palette-based residual block 1004 into two groups, major color pixels and prediction pixels. The major color pixels may be pixels with pixel values, for example C0 and C1 as shown, where the pixel values are associated with major color values in a decoded palette table, such as the palette table 316 of FIG. 3. The prediction pixels may be special pixels, shown as "P" in the palette-based residual block 804. If a pixel is encoded as "P", the video compression system 1002 may directly use its corresponding prediction pixel value from the prediction block 104 as the corresponding reconstructed pixel value for the reconstructed block 1008. If a pixel in the palette-based residual block 1004 were a major color pixel having a corresponding major color value, such as C0 or C1, in the decoded palette table, the video compression system 1002 would use the corresponding major color value to reconstruct the reconstructed block 1008 as shown.

Figure 12:
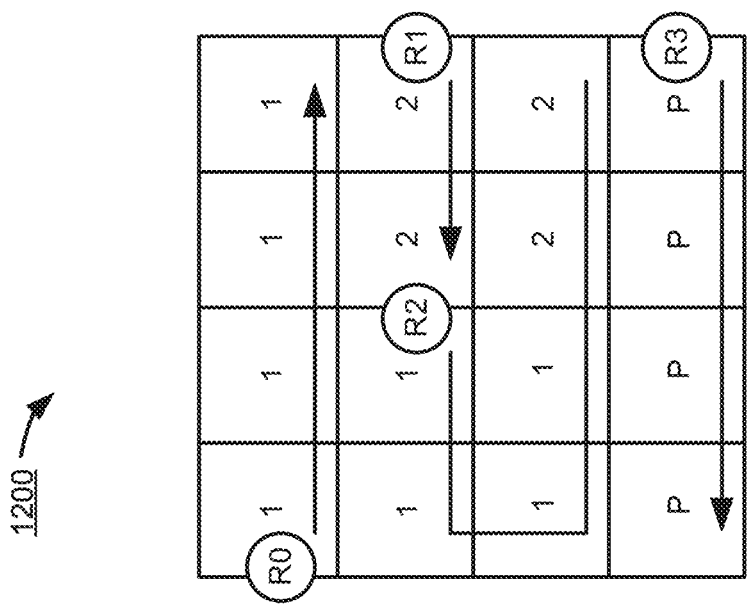
FIG. 12 illustrates an example palette index map coding for the palette-based residual refinement method.

FIG. 12 illustrates an example palette index map coding 1200 for the palette-based residual refinement method.

To signal whether a pixel in the palette-based residual block 1004 is a major color pixel or a prediction pixel, the video compression system 1002 may reserve a special color index, for example, 0, as shown under a palette index 1202 of a parameter table 1204, the maximal index value, or a pre-defined value. The video compression system 1002 may then use a conventional palette mode to decode a palette index map 1206 as described above with reference to FIG. 5. The indices form the palette index map 1206 which is divided into several runs and then encoded in horizontal or vertical traverse scan order. In this example, the horizontal scan order is assumed, and the direction of the scan is shown as arrows in the palette index map 1206. In the palette index map 1206, 16 indices are encoded by run indices, four runs R0, R1, R2, and R3 shown under a run mode 1208, with a horizontal traverse scan. There are two run modes, copy index mode and copy above mode, as shown under a run mode 1210, and for each starting position of a run, a flag is transmitted to indicate which run mode is used.

If a pixel in the palette index map 1206 were identified to have the reserved color index, it would be identified as a prediction pixel. In FIG. 12, the bottom four pixels are identified as prediction pixels. The video compression system 1002 may reserve a special color index, "0" in this example, for these prediction pixels. The video compression system 1002 may use the copy index run, R3, for the four prediction pixels as indicated by a run of pixels 1212 to signal those four prediction pixels.

Figure 13:
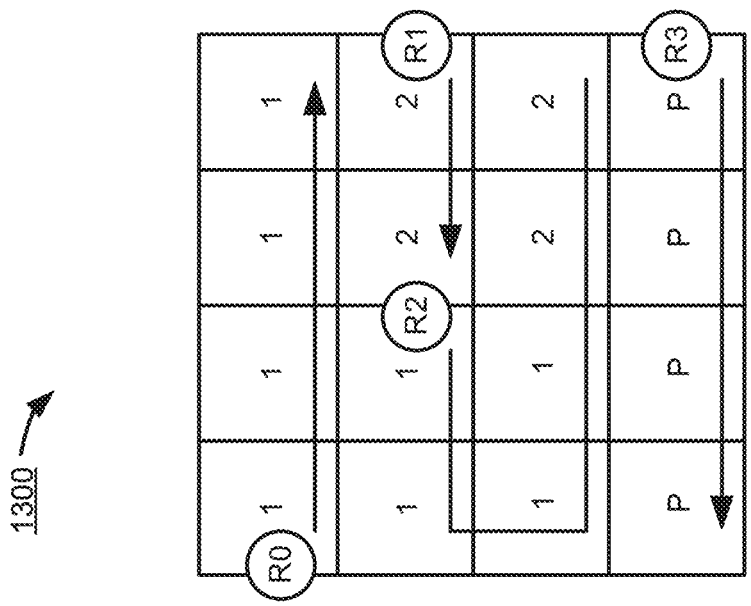
FIG. 13 illustrates another example palette index map coding for the palette-based residual refinement method.

FIG. 13 illustrates another example palette index map coding 1300 for the palette-based residual refinement method.

To signal whether a pixel in the palette-based residual block 1004 is a major color pixel or a prediction pixel, the video compression system 1002 may utilize a special run, such as a prediction run as shown "prediction" under a run mode 1302 of a parameter table 1304 instead of reserving a special color index under a palette index 1306. The video compression system 1002 may identify a prediction pixel of the palette-based residual block 1004 as a pixel encoded by the prediction run. Similar to the palette index map coding of FIG. 12, the indices form the palette index map 1206 which is divided into four runs and then encoded in a horizontal scan order shown as arrows. In the palette index map 1206, 16 indices are encoded by run indices 1308, four runs R0, R1, R2, and R3 with horizontal traverse scan. There are three, copy index mode, copy above mode, and prediction mode, under the run mode 1302, and for each starting position of a run, a flag is transmitted to indicate which run mode is used. If a pixel in the palette index map 1206 were identified to have been encoded by the prediction run, it would be identified as a prediction pixel. In FIG. 13, the video compression system 1002 may use the prediction run, R3, for the four bottom pixels to encode as prediction pixels as indicated by a run of pixels 1310 and signal those four pixels as prediction pixels.

However, it is not efficient to apply a full version of the HEVC palette mode or the palette-based residual refinement method on coding units of all sizes when a subset of intra/inter prediction tools is adequate for small coding units.

Figure 14:
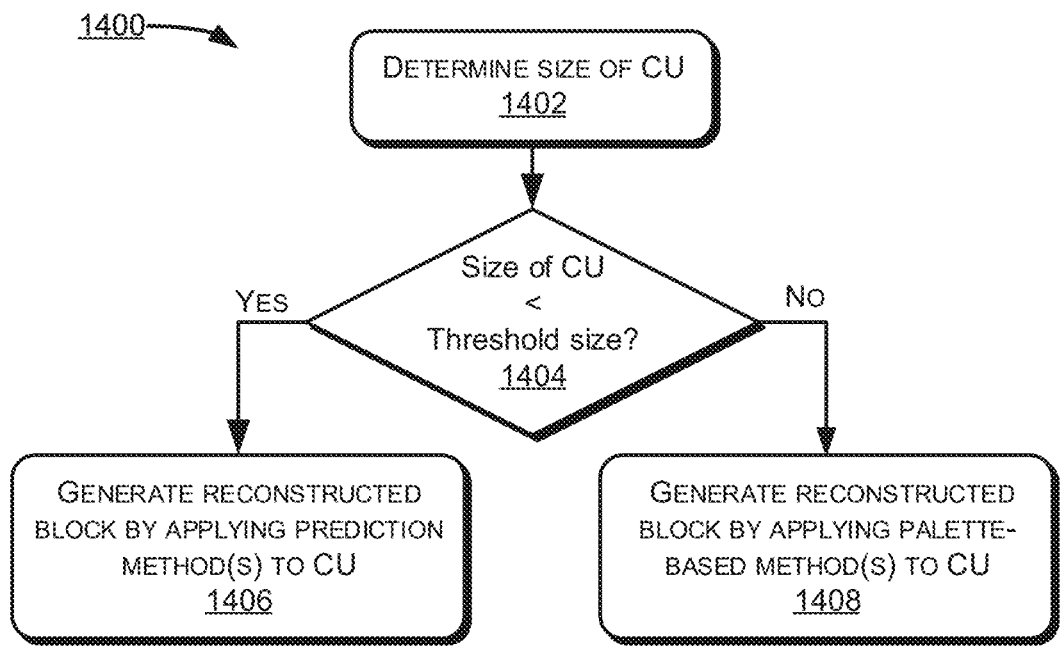
FIG. 14 illustrated an example flowchart of the coding unit size adaptive palette mode for improving efficiency of decoding a coding unit.

FIG. 14 illustrates an example flowchart 1400 of the coding unit (CU) size adaptive palette mode for improving efficiency of decoding a CU.

At block 1402, the size of a CU to be decoded may be determined, and the size of the CU may be compared to a threshold size at block 1404. The size of the CU being considered may be a length, a width, or a product of the length and the width, of the CU, which may be compared to a correspond threshold size, i.e., a length threshold, a width threshold, or a product threshold. If the size of the CU is determined to be less than the threshold size, a reconstructed block may be generated by applying a prediction method(s) to the CU at block 1406. If the size of the CU is determined not to be less than the threshold size, i.e., the size of the CU greater than or equal to the threshold size, a reconstructed block may be generated by applying a palette-based method(s) to the CU at block 1408.

Figure 15:
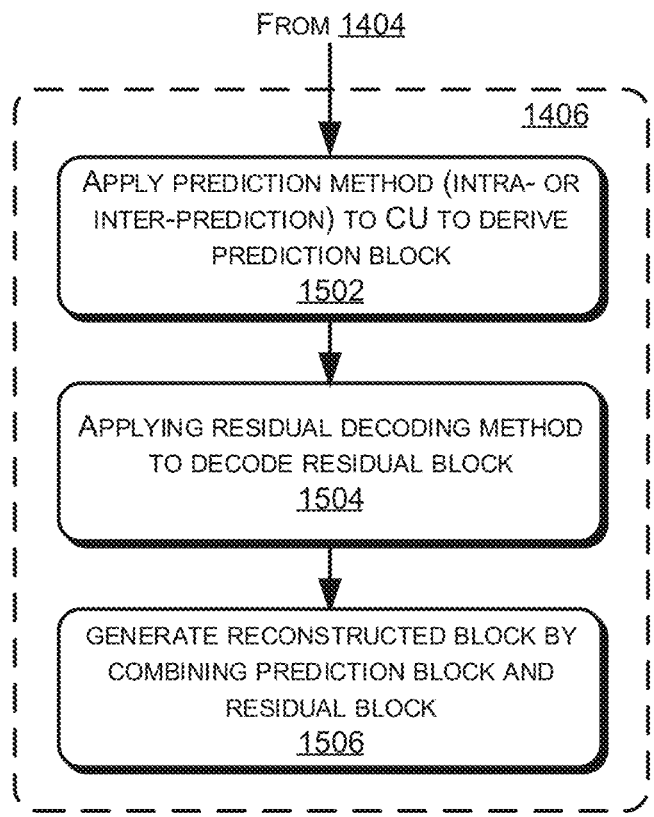
FIG. 15 illustrates an example detailed process of one of blocks of FIG. 14.

FIG. 15 illustrates an example detailed process of block 1406 of FIG. 14.

At block 1502, a prediction method, such as intra-prediction or inter-prediction, may be applied to the CU to derive a prediction block as discussed above with reference to FIG. 1. The prediction method may include an inter-prediction method and an intra-prediction method including a position dependent intra prediction combination (PDPC). At block 1504, a residual decoding method may be applied to a residual block to decode the residual block, and at block 1506, a reconstructed block may be generated by combining the prediction block and the residual block. As discussed above with reference to FIG. 2, combining the prediction block and the residual block may be accomplished by simply adding corresponding pixel values of the prediction block and the residual block to generate corresponding pixel values of the reconstructed block.

Figure 16:
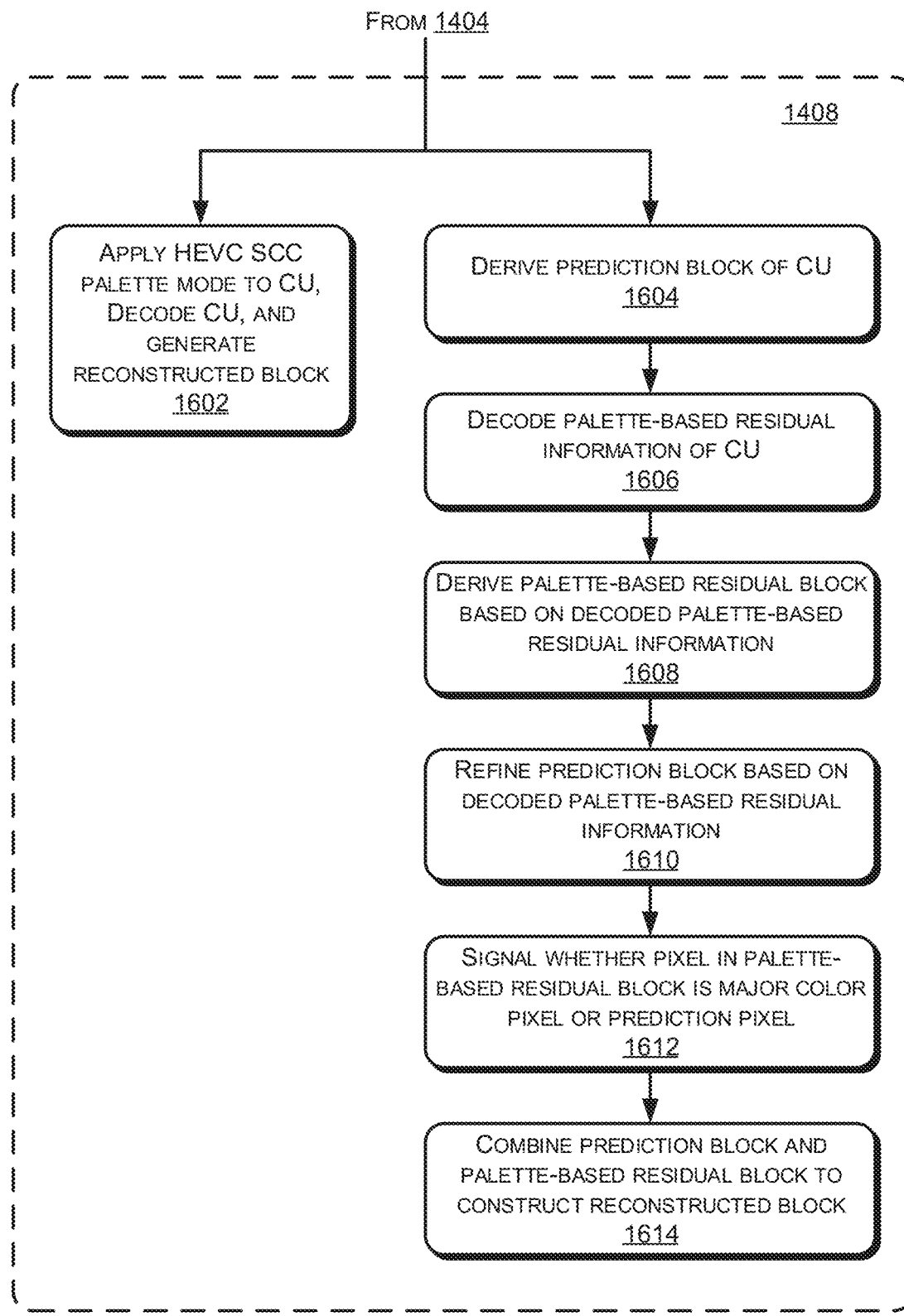
FIG. 16 illustrates an example detailed process of another block of FIG. 14.

FIG. 16 illustrates an example detailed process of block 1408 of FIG. 14.

The palette-based method may include an HEVC SCC palette mode as described above with reference to FIGS. 3-5 and a palette-based residual refinement method as described above with reference to FIG. 8-13. If the HEVC SCC palette mode is used, the HEVC SCC palette mode may be applied to the CU to decode the CU and generate the reconstructed block at block 1602.

For using the palette-based residual refinement method, a prediction block of the CU may be derived at block 1604, which may be accomplished by using a palette of a non-adjacent CU relative to the CU as a palette predictor to predict a palette table of the CU and applying predicting coding to the palette table to derive the prediction block. The prediction block of the CU may also be derived by applying a subset of tools of the prediction method to the CU to derive the prediction block. The prediction method may include an inter-prediction method and an intra-prediction method including a position dependent intra prediction combination (PDPC), and the subset of tools may include a subset of prediction angles from the intra-angular prediction modes and multi-reference line (MRL) intra-prediction. The MRL intra-prediction may utilize explicit signaling where a selected reference line index is signaled before the intra-prediction mode and is used to generate an intra predictor. At block 1606, palette-based residual information of the CU may be decoded, and a palette-based residual block may be derived based on the decoded palette-based residual information at block 1608. At block 1610, the prediction block may be refined based on the decoded palette-based residual information, which may be accomplished by decoding the palette-based residual block, classifying pixels of the palette-based residual block into major color pixels and prediction pixels where the major color pixels have palette indices associated with major color pixel values of the decoded palette-based residual block, assigning a respective predetermined color index to each of the prediction pixels, and generating a palette index map based on the major color pixels and prediction pixels.

At block 1612, whether a pixel in the palette-based residual block is a major color pixel or a prediction pixel is signaled by decoding the palette index map and identifying an index having the predetermined color index as a prediction pixel, or identifying a pixel encoded by a prediction run as a prediction pixel. The prediction block and the palette-based residual block may then be combined to construct the reconstructed block at block 1614. The reconstructed block may be constructed by using the major color pixel values of the major color pixels in the reconstructed block and transferring pixel values of the prediction block for the prediction pixels in the reconstructed block.

Figure 17:
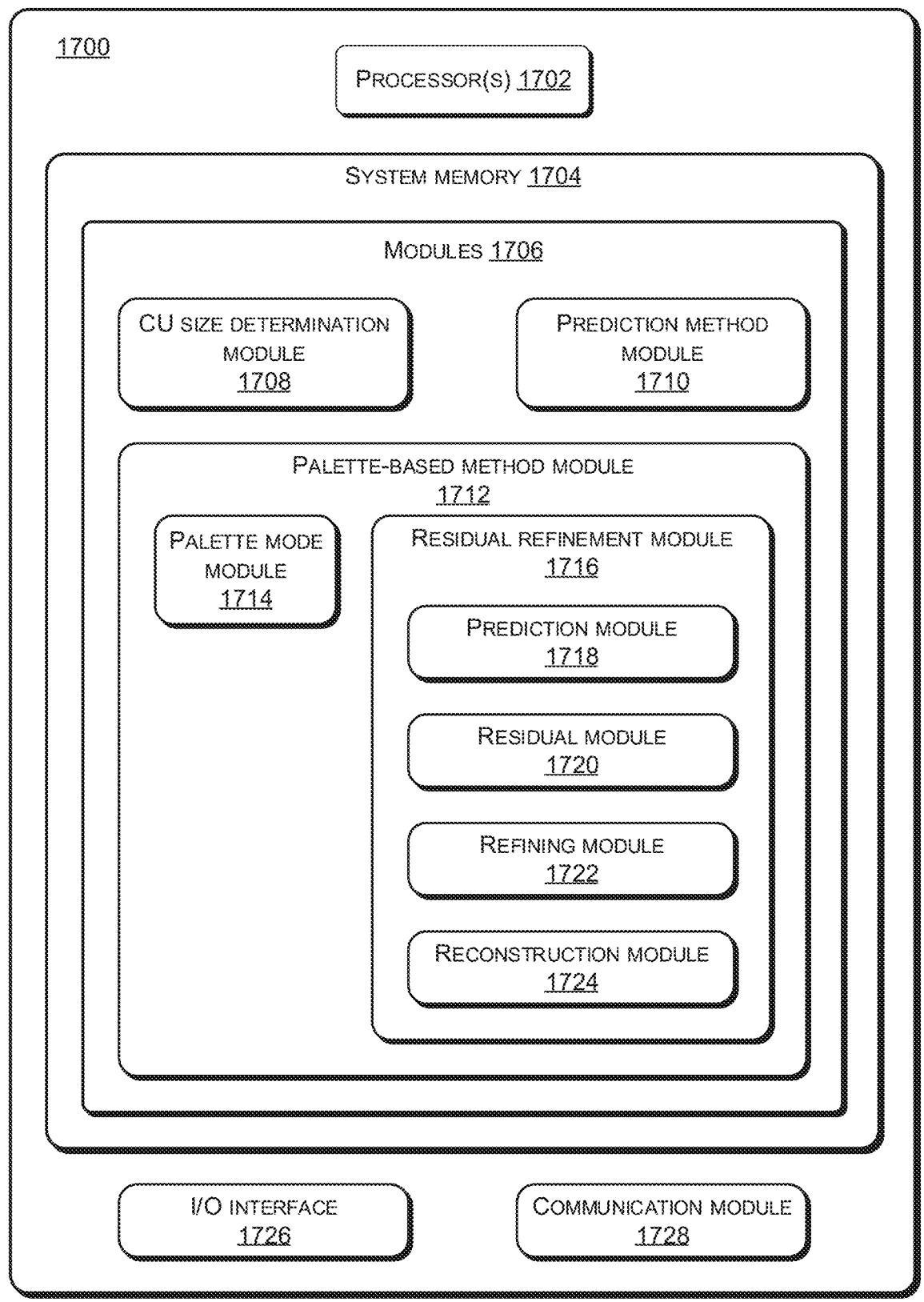
FIG. 17 illustrates an example system for implementing the processes and methods for improving efficiency of decoding performance by selectively applying a palette mode, a palette-based residual refinement method, or a prediction method based on the size of the coding unit.

FIG. 17 illustrates an example system 1700 for implementing the processes and methods described above for improving efficiency of decoding performance by selectively applying a palette mode, a palette-based residual refinement method, or a prediction method based on the size of the coding unit.

The techniques and mechanisms described herein may be implemented by multiple instances of the system 1700 as well as by any other computing device, system, and/or environment. The system 1700 shown in FIG. 17 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 1700 may include one or more processors 1702 and system memory 1704 communicatively coupled to the processor(s) 1702. The processor(s) 1702 may execute one or more modules and/or processes to cause the processor(s) 1702 to perform a variety of functions. In some embodiments, the processor(s) 1702 may include a central processing unit (CPU), a graphics processing unit (GPU), both CPU and GPU, or other processing units or components known in the art. Additionally, each of the processor(s) 1702 may possess its own local memory, which also may store program modules, program data, and/or one or more operating systems.

Depending on the exact configuration and type of the system 1700, the system memory 1704 may be volatile, such as RAM, non-volatile, such as ROM, flash memory, miniature hard drive, memory card, and the like, or some combination thereof. The system memory 1704 may include one or more computer-executable modules (modules) 1706 that are executable by the processor(s) 1702.

The modules 1706 may include, but are not limited to, a coding unit (CU) size determination module 1708, a prediction method module 1710, and a palette-based method module 1712. The CU size determination module 1708 may be configured to determine a size of a CU and to determine whether the size of the CU is less than a threshold size. The size of the coding unit being considered may be a length, a width, or a product of the length and the width, of the coding unit, which may be compared to a correspond threshold size, i.e., a length threshold, a width threshold, or a product threshold.

The prediction method module 1710 may be configured to generate a reconstructed block by applying a prediction method to the CU in response to the CU size determination module 1708 determining that the size of the CU is less than the threshold size. The prediction method module 1710 may be further configured to apply the prediction method, such as an inter-prediction method and an intra-prediction method including a position dependent intra prediction combination (PDPC), to the CU to derive a prediction block, apply a residual decoding method to a residual block, and generate a reconstructed block by combining the prediction block and the residual block.

The palette-based method module 1712 may be configured to generate a reconstructed block by applying a palette-based method in response to the CU size determination module determining that the size of the CU is not less than the threshold size. The palette-based method module 1712 may comprise a palette mode module 1714 and a palette-based residual refinement module (residual refinement module) 1716. The palette mode module 1714 may be configured to apply an HEVC SCC palette mode to the CU, decode the CU, and generate the reconstructed block.

The residual refinement module 1716 may be configured to apply a palette-based residual refinement method to the CU to generate the reconstructed block, and may comprise a prediction module 1718, a residual module 1720, a refining module 1722, and a reconstruction module 1724. The prediction module 1718 may be configured to use a palette of a non-adjacent CU relative to the CU as a palette predictor to predict a palette table of the CU and apply the predicting coding to a palette table, such as the palette table 316 to derive a prediction block, such as the prediction block 104. The prediction module 1718 may also be configured to apply a subset of tools of the prediction method to the CU to derive the prediction block. The prediction method may include an inter-prediction method and an intra-prediction method including a position dependent intra prediction combination (PDPC), and the subset of tools may include a subset of prediction angles from the intra-angular prediction modes and multi-reference line (MRL) intra-prediction. The MRL intra-prediction may utilize explicit signaling where a selected reference line index is signaled before the intra-prediction mode and is used to generate an intra predictor. The residual module 1720 may be configured to decode palette-based residual information of the coding unit and to derive a palette-based residual block, such as the palette-based residual block 1004, based on the decoded palette-based residual information. The reconstruction module 1724 may be configured to combine the prediction block 104 and the palette-based residual block 1004 to construct a reconstructed block, such as the reconstructed block 1008.

The refining module 1722 may be further configured to decode the palette-based residual block 1004 and classify pixels of the palette-based residual block 1004 into major color pixels and prediction pixel. The major color pixels may have palette indices associated with major color pixel values of the decoded palette-based residual block 1004. The refining module 1722 may be additionally configured to generate a palette index map, such as the palette index map 1206, based on the major color pixels and prediction pixels, and assign a predetermined color index, such as C0, C1, etc. to prediction pixels as shown in FIG. 11.

The reconstruction module 1724 may be further configured to signal whether a pixel in the palette-based residual block is a major color pixel or a prediction pixel by decoding the palette index map 1206 and identifying an index having the predetermined color index as a prediction pixel as discussed above with reference to FIG. 12, or by identifying a pixel encoded by a prediction run as a prediction pixel as discussed above with reference to FIG. 13. The reconstruction module 1724 may be configured to use the major color pixel values of the major color pixels in the reconstructed block 1008 and transfer pixel values of the prediction block for the prediction pixels in the reconstructed block 1008, thus combining the palette mode and the traditional prediction methods.

The system 1700 may additionally include an input/output (I/O) interface 1726 for receiving data associated with a CU, such as encoded data of the CU 302, to be processed, and for outputting the processed data of the coding unit, such as the reconstructed block 1008. The system 1700 may also include a communication module 1728 allowing the system 1700 to communicate with other devices (not shown) over a network (not shown). The network may include the Internet, wired media such as a wired network or direct-wired connections, and wireless media such as acoustic, radio frequency (RF), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-17. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

A. A method comprising: determining a size of a coding unit (CU); determining whether the size of the CU is less than a threshold size; and upon determining that the size of the CU is less than the threshold size, generating a reconstructed block by applying a prediction method to the CU.

B. The method as paragraph A recites, wherein generating the reconstructed block by applying the prediction method to the CU comprises: applying the prediction method to the CU to derive a prediction block; applying a residual decoding method to a residual block; and generating the reconstructed block by combining the prediction block and the residual block, wherein the prediction method includes an inter-prediction method and an intra-prediction method including a position dependent intra prediction combination (PDPC).

C. The method as paragraph A recited, further comprising: upon determining that the size of the CU is not less that the threshold size, generating a reconstructed block by applying a palette-based method to the CU D. The method as paragraph C recites, wherein generating the reconstructed block by applying the palette-based method to the CU includes: applying a Screen Content Coding Extensions of High Efficiency Video Coding (HEVC SCC) palette mode to the CU, decoding the CU; or generating the reconstructed block, and applying a palette-based residual refinement method to the CU to generate the reconstructed block.

E. The method as paragraph D recites, wherein applying the palette-based residual refinement method to the CU to generate the reconstructed block comprises: deriving a prediction block of the CU; decoding palette-based residual information of the CU; deriving a palette-based residual block based on the decoded palette-based residual information; refining the prediction block based on the decoded palette-based residual information; and combining the prediction block and the palette-based residual block to construct a reconstructed block.

F. The method as paragraph E recites, wherein deriving the prediction block of the CU includes one of: using a palette of a non-adjacent CU relative to the CU as a palette predictor to predict a palette table of the CU and applying predicting coding to the palette table to derive the prediction block; or applying a subset of tools of the prediction method including a subset of predictions angles to the CU to derive the prediction block wherein the prediction method includes an inter-prediction method and an intra-prediction method including a position dependent intra prediction combination (PDPC).

G. The method as paragraph F recites, wherein refining the prediction block based on the decoded palette-based residual information comprises: decoding the palette-based residual block; classifying pixels of the palette-based residual block into major color pixels and prediction pixels, the major color pixels having palette indices associated with major color pixel values of the decoded palette-based residual block; assigning a respective predetermined color index to each of the prediction pixels; and generating a palette index map based on the major color pixels and prediction pixels.

H. The method as paragraph G recites, further comprising signaling whether a pixel in the palette-based residual block is a major color pixel or a prediction pixel by: decoding the palette index map and identifying an index having the predetermined color index as a prediction pixel; or identifying a pixel encoded by a prediction run as a prediction pixel, wherein combining the prediction block and the palette-based residual block to construct the reconstructed block comprises: using the major color pixel values of the major color pixels in the reconstructed block; and transferring pixel values of the prediction block for the prediction pixels in the reconstructed block.

I. A computer-readable storage medium storing computer-readable instructions executable by one or more processors, that when executed by the one or more processors, cause the one or more processors to perform operations comprising: determining a size of a coding unit (CU); determining whether the size of the CU is less than a threshold size; and upon determining that the size of the CU is less than the threshold size, generating a reconstructed block by applying a prediction method to the CU.

J. The computer-readable storage medium as paragraph I recites, wherein decoding the CU by applying the prediction method comprises: applying the prediction method to the CU to derive a prediction block; applying a residual decoding method to a residual block; and generating a reconstructed block by combining the prediction block and the residual block, wherein the prediction method includes an inter-prediction method and an intra-prediction method including a position dependent intra prediction combination (PDPC).

K. The computer-readable storage medium as paragraph I recites, wherein the operations further comprise: upon determining that the size of the CU is not less that the threshold size, generating a reconstructed block by applying a palette-based method to the CU, wherein generating the reconstructed block by applying the palette-based method to the CU includes: applying a Screen Content Coding Extensions of High Efficiency Video Coding (HEVC SCC) palette mode to the CU, decoding the CU, and generating the reconstructed block, or applying a palette-based residual refinement method to the CU to generate the reconstructed block.

L. The computer-readable storage medium as paragraph K recites, wherein applying the palette-based residual refinement method to the CU to generate the reconstructed block comprises: deriving a prediction block of the CU; decoding palette-based residual information of the CU; deriving a palette-based residual block based on the decoded palette-based residual information; refining the prediction block based on the decoded palette-based residual information; and combining the prediction block and the palette-based residual block to construct a reconstructed block.

M. The computer-readable storage medium as paragraph L recites, wherein deriving the prediction block of the CU includes one of: using a palette of a non-adjacent coding unit relative to the CU as a palette predictor to predict a palette table of the CU and applying predicting coding to the palette table to derive the prediction block; or applying a subset of tools of the prediction method including a subset of predictions angles to the CU to derive the prediction block wherein the prediction method includes an inter-prediction method and an intra-prediction method including a position dependent intra prediction combination (PDPC).

N. The computer-readable storage medium as paragraph M recites, wherein refining the prediction block based on the decoded palette-based residual information comprises: decoding the palette-based residual block; classifying pixels of the palette-based residual block into major color pixels and prediction pixels, the major color pixels having palette indices associated with major color pixel values of the decoded palette-based residual block; assigning a respective predetermined color index to each of the prediction pixels; and generating a palette index map based on the major color pixels and prediction pixels.

O. The computer-readable storage medium as paragraph M recites, wherein the operations further comprise: signaling whether a pixel in the palette-based residual block is a major color pixel or a prediction pixel by: decoding the palette index map and identifying an index having the predetermined color index as a prediction pixel; or identifying a pixel encoded by a prediction run as a prediction pixel, wherein combining the prediction block and the palette-based residual block to construct the reconstructed block comprises: using the major color pixel values of the major color pixels in the reconstructed block; and transferring pixel values of the prediction block for the prediction pixels in the reconstructed block.

P. A system comprising: one or more processors; and memory communicatively coupled to the one or more processors, the memory storing computer-executable modules executable by the one or more processors that, when executed by the one or more processors, perform associated operations, the computer-executable modules including: a coding unit (CU) size determination module configured to determine a size of a CU and to determine whether the size of the CU is less than a threshold size; and a prediction method module configured to generate a reconstructed block by applying a prediction method to the CU in response to the CU size determination module determining that the size of the CU is less than the threshold size.

Q. The system as paragraph P recites, wherein the prediction method module is further configured to: apply the prediction method to the CU to derive a prediction block; apply a residual decoding method to a residual block; and generate a reconstructed block by combining the prediction block and the residual block, wherein the prediction method includes an inter-prediction method and an intra-prediction method including a position dependent intra prediction combination (PDPC).

R. The system as paragraph P recites, further comprising: a palette-based method module configured to generate a reconstructed block by applying a palette-based method in response to the CU size determination module determining that the size of the CU is not less than the threshold size, the palette-based method module including: a palette mode module configured to apply a Screen Content Coding Extensions of High Efficiency Video Coding (HEVC SCC) palette mode to the CU, decode the CU, and generate the reconstructed block, or a palette-based residual refinement module configured to apply a palette-based residual refinement method to the CU to generate the reconstructed block.

S. The system as paragraph R recites, wherein the palette-based residual refinement module further comprises: a prediction module configured to use a palette of a non-adjacent CU relative to the CU as a palette predictor to predict a palette table of the CU and apply predicting coding to the palette table to derive the prediction block of the CU or apply a subset of tools of the prediction method including a subset of predictions angles to the CU to derive the prediction block wherein the prediction method includes an inter-prediction method and an intra-prediction method including a position dependent intra prediction combination (PDPC); a residual module configured to decode palette-based residual information of the CU and to derive a palette-based residual block based on the decoded palette-based residual information; a refining module configured to refine the prediction block based on the decoded palette-based residual information by: decoding the palette-based residual block, classifying pixels of the palette-based residual block into major color pixels and prediction pixels, the major color pixels having palette indices associated with major color pixel values of the decoded palette-based residual block, assigning a respective predetermined color index to each of the prediction pixels, and generating a palette index map based on the major color pixels and prediction pixels; and a reconstruction module configured to combine the prediction block and the palette-based residual block to construct a reconstructed block.

T. The system as paragraph S recites, wherein the reconstruction module is further configured to: signal whether a pixel in the palette-based residual block is a major color pixel or a prediction pixel by: decoding the palette index map and identifying an index having the predetermined color index as a prediction pixel; or identifying a pixel encoded by a prediction run as a prediction pixel; use the major color pixel values of the major color pixels in the reconstructed block; and transfer pixel values of the prediction block for the prediction pixels in the reconstructed block.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   determining a size of a coding unit (CU);
   determining whether the size of the CU is less than a threshold size;
   upon determining that the size of the CU is less than the threshold size, generating a reconstructed block by applying a prediction method to the CU, and
   upon determining that the size of the CU is not less than the threshold size, generating a reconstructed block including:
      deriving a prediction block of the CU by using a palette of a non-adjacent CU relative to the CU as a palette predictor to predict a palette table of the CU and applying predicting coding to the palette table to derive the prediction block.

2. The method of claim 1, wherein generating the reconstructed block by applying the prediction method to the CU comprises:
   applying the prediction method to the CU to derive a prediction block;
   applying a residual decoding method to a residual block; and
   generating the reconstructed block by combining the prediction block and the residual block,
   wherein the prediction method includes an inter-prediction method and an intra-prediction method including a position dependent intra prediction combination (PDPC).

3. The method of claim 1, wherein generating the reconstructed block further includes:
   applying a Screen Content Coding Extensions of High Efficiency Video Coding (HEVC SCC) palette mode to the CU, decoding the CU, and generating the reconstructed block.

4. The method of claim 1, wherein generating the reconstructed block further includes:
   decoding palette-based residual information of the CU;
   deriving a palette-based residual block based on the decoded palette-based residual information;
   refining the prediction block based on the decoded palette-based residual information; and
   combining the prediction block and the palette-based residual block to construct the reconstructed block.

5. The method of claim 4, wherein deriving the prediction block of the CU further includes:
   applying a subset of tools of the prediction method including a subset of predictions angles to the CU to derive the prediction block wherein the prediction method includes an inter-prediction method and an intra-prediction method including a position dependent intra prediction combination (PDPC).

6. The method of claim 1, wherein refining the prediction block based on the decoded palette-based residual information comprises:
   decoding the palette-based residual block;
   classifying pixels of the palette-based residual block into major color pixels and prediction pixels, the major color pixels having palette indices associated with major color pixel values of the decoded palette-based residual block;
   assigning a respective predetermined color index to each of the prediction pixels; and
   generating a palette index map based on the major color pixels and prediction pixels.

7. The method of claim 6, further comprising:
   signaling whether a pixel in the palette-based residual block is a major color pixel or a prediction pixel by:
      decoding the palette index map and identifying an index having the predetermined color index as a prediction pixel; or
      identifying a pixel encoded by a prediction run as a prediction pixel,
   wherein combining the prediction block and the palette-based residual block to construct the reconstructed block comprises:
      using the major color pixel values of the major color pixels in the reconstructed block; and
      transferring pixel values of the prediction block for the prediction pixels in the reconstructed block.

8. A computer-readable storage medium storing computer-readable instructions executable by one or more processors, that when executed by the one or more processors, cause the one or more processors to perform operations comprising:

determining a size of a coding unit (CU);

determining whether the size of the CU is less than a threshold size; and upon determining that the size of the CU is less than the threshold size, generating a reconstructed block by applying a prediction method to the CU, and upon determining that the size of the CU is not less than the threshold size, generating a reconstructed block including:

deriving a prediction block of the CU by using a palette of a non-adjacent CU relative to the CU as a palette predictor to predict a palette table of the CU and applying predicting coding to the palette table to derive the prediction block.

9. The computer-readable storage medium of claim 8, wherein decoding the CU by applying the prediction method comprises:

applying the prediction method to the CU to derive a prediction block;

applying a residual decoding method to a residual block; and generating a reconstructed block by combining the prediction block and the residual block, wherein the prediction method includes an inter-prediction method and an intra-prediction method including a position dependent intra prediction combination (PDPC).

10. The computer-readable storage medium of claim 8, wherein generating the reconstructed block further includes:

applying a Screen Content Coding Extensions of High Efficiency Video Coding (HEVC SCC) palette mode to the CU, decoding the CU, and generating the reconstructed block.

11. The computer-readable storage medium of claim 8, wherein generating the reconstructed block further includes:

decoding palette-based residual information of the CU;

deriving a palette-based residual block based on the decoded palette-based residual information;

refining the prediction block based on the decoded palette-based residual information; and combining the prediction block and the palette-based residual block to construct a reconstructed block.

12. The computer-readable storage medium of claim 11, wherein deriving the prediction block of the CU further includes:

applying a subset of tools of the prediction method including a subset of predictions angles to the CU to derive the prediction block wherein the prediction method includes an inter-prediction method and an intra-prediction method including a position dependent intra prediction combination (PDPC).

13. The computer-readable storage medium of claim 8, wherein refining the prediction block based on the decoded palette-based residual information comprises:

decoding the palette-based residual block;

classifying pixels of the palette-based residual block into major color pixels and prediction pixels, the major color pixels having palette indices associated with major color pixel values of the decoded palette-based residual block;

assigning a respective predetermined color index to each of the prediction pixels; and generating a palette index map based on the major color pixels and prediction pixels.

14. The computer-readable storage medium of claim 13, wherein the operations further comprise:

signaling whether a pixel in the palette-based residual block is a major color pixel or a prediction pixel by:

decoding the palette index map and identifying an index having the predetermined color index as a prediction pixel; or identifying a pixel encoded by a prediction run as a prediction pixel, wherein combining the prediction block and the palette-based residual block to construct the reconstructed block comprises:

using the major color pixel values of the major color pixels in the reconstructed block; and transferring pixel values of the prediction block for the prediction pixels in the reconstructed block.

15. A system comprising:

one or more processors; and memory communicatively coupled to the one or more processors, the memory storing computer-executable modules executable by the one or more processors that, when executed by the one or more processors, perform associated operations, the computer-executable modules including:

a coding unit (CU) size determination module configured to determine a size of a CU and to determine whether the size of the CU is less than a threshold size;

a prediction method module configured to generate a reconstructed block by applying a prediction method to the CU in response to the CU size determination module determining that the size of the CU is less than the threshold size; and a palette-based method module configured to generate a reconstructed block by applying a palette-based method in response to the CU size determination module determining that the size of the CU is not less than the threshold size, the palette-based method module including:

a palette-based residual refinement module configured to apply a palette-based residual refinement method to the CU to generate the reconstructed block, the palette-based residual refinement module comprising:

a prediction module configured to use a palette of a non-adjacent CU relative to the CU as a palette predictor to predict a palette table of the CU and apply predicting coding to the palette table to derive the prediction block of the CU.

16. The system of claim 15, wherein the prediction method module is further configured to:

apply the prediction method to the CU to derive a prediction block;

apply a residual decoding method to a residual block; and generate a reconstructed block by combining the prediction block and the residual block, wherein the prediction method includes an inter-prediction method and an intra-prediction method including a position dependent intra prediction combination (PDPC).

17. The system of claim 15, wherein the palette-based method module further includes:

a palette mode module configured to apply a Screen Content Coding Extensions of High Efficiency Video Coding (HEVC SCC) palette mode to the CU, decode the CU, and generate the reconstructed block.

18. The system of claim 15, wherein the the prediction module is further apply a subset of tools of the prediction method including a subset of predictions angles to the CU to derive the prediction block wherein the prediction method includes an inter-prediction method and an intra-prediction method including a position dependent intra prediction combination (PDPC), and wherein the palette-based residual refinement module further comprises:

a residual module configured to decode palette-based residual information of the CU and to derive a palette-based residual block based on the decoded palette-based residual information;

refining module is configured to refine the prediction block based on the decoded palette-based residual information by:

decoding the palette-based residual block, classifying pixels of the palette-based residual block into major color pixels and prediction pixels, the major color pixels having palette indices associated with major color pixel values of the decoded palette-based residual block, assigning a respective predetermined color index to each of the prediction pixels, and generating a palette index map based on the major color pixels and prediction pixels; and a reconstruction module configured to combine the prediction block and the palette-based residual block to construct a reconstructed block.

19. The system of claim 18, wherein the reconstruction module is further configured to:

signal whether a pixel in the palette-based residual block is a major color pixel or a prediction pixel by:

decoding the palette index map and identifying an index having the predetermined color index as a prediction pixel; or identifying a pixel encoded by a prediction run as a prediction pixel;

use the major color pixel values of the major color pixels in the reconstructed block; and transfer pixel values of the prediction block for the prediction pixels in the reconstructed block.

* * * * *